(12) United States Patent
Ma

(10) Patent No.: US 12,657,772 B2
(45) Date of Patent: Jun. 16, 2026

(54) IMAGE CALIBRATION SYSTEM AND IMAGE CALIBRATION METHOD FOR CALIBRATING IMAGE CAPTURING DEVICE

(71) Applicant: Novatek Microelectronics Corp., Hsinchu (TW)

(72) Inventor: Hsiang-Yi Ma, New Taipei City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/769,426

(22) Filed: Jul. 11, 2024

(65) Prior Publication Data

US 2026/0017823 A1 Jan. 15, 2026

(51) Int. Cl.
*G06T 7/80* (2017.01)
*G06F 3/14* (2006.01)

(52) U.S. Cl.
CPC .................. *G06T 7/80* (2017.01); *G06F 3/14* (2013.01); *G06T 2207/30168* (2013.01)

(58) Field of Classification Search
CPC ... G06T 7/80; G06T 7/85; G06T 2207/30168; H04N 17/002; G06F 3/14
See application file for complete search history.

(56) References Cited

U.S. PATENT DOCUMENTS 8,619,144 B1 * 12/2013 Chang .................. H04N 17/002
                                                                  348/187
9,172,871 B2 10/2015 Zhao et al.

9,330,326 B2 * 5/2016 Boncyk ............ H04N 21/23418
9,965,870 B2 * 5/2018 Claveau ............... H04N 17/002
10,235,774 B1 * 3/2019 Gitz ......................... H04N 7/18
10,269,141 B1 * 4/2019 Shotan .................... G01S 17/86
10,445,898 B2 * 10/2019 Liu ........................... G06T 7/80
10,453,218 B2 * 10/2019 Doganis ................... G06T 7/80
(Continued)

FOREIGN PATENT DOCUMENTS

CN         102438153        5/2012
CN         118075616        5/2024
(Continued)

OTHER PUBLICATIONS

"Office Action of Taiwan Counterpart Application", issued on Feb. 18, 2025, p. 1-p. 8.

*Primary Examiner* — Brian P Yenke
(74) *Attorney, Agent, or Firm* — JCIPRNET

(57) ABSTRACT

An image calibration system including an image capturing device, a calibration unit, a mount plate, and a processor are provided. The image capturing device includes at least one camera module. The processor is configured to: control the at least one camera module to capture an image of the calibration unit; determine whether there is any other part of the calibration unit not captured yet based on images already captured by the at least one camera module; and in response to determining that there is at least a part of the calibration unit not shown in the captured images, control the at least one camera module to capture another image of the calibration unit. The processor further calculates image calibration parameters based on a sufficient number of qualified images captured by the at least one camera module. The image calibration parameters are used for calibrating image distortion.

16 Claims, 10 Drawing Sheets

(56)                    References Cited

U.S. PATENT DOCUMENTS

| | | | |
|---|---|---|---|
| 10,499,037 B1* | 12/2019 | Wilcox | H04N 23/57 |
| 10,510,162 B2* | 12/2019 | Doganis | G06T 7/13 |
| 10,552,983 B1* | 2/2020 | Slobodyanyuk | G06T 7/80 |
| 10,735,710 B2* | 8/2020 | Fang | H04N 13/128 |
| 10,928,193 B2* | 2/2021 | Allen | H04N 13/239 |
| 11,206,378 B2* | 12/2021 | Wang | H04N 17/002 |
| 11,348,281 B1* | 5/2022 | Tang | H04N 13/246 |
| 11,508,088 B2* | 11/2022 | Islam | B25J 9/1697 |
| 11,528,410 B2* | 12/2022 | Okuhara | G06T 7/80 |
| 11,721,040 B2* | 8/2023 | Koyama | H04N 17/002 |
| | | | 702/94 |
| 11,941,840 B2* | 3/2024 | Chen | B25J 9/1697 |
| 12,106,517 B2* | 10/2024 | Feldman | H04N 17/002 |
| 12,175,559 B2 | 12/2024 | Lee | |
| 12,240,129 B2* | 3/2025 | Melrose | B25J 9/1697 |
| 12,358,145 B2* | 7/2025 | Wang | B25J 9/1692 |
| 2007/0047915 A1* | 3/2007 | Nomura | G11B 27/322 |
| | | | 386/230 |
| 2010/0321490 A1* | 12/2010 | Chen | G06T 7/62 |
| | | | 348/118 |
| 2013/0083168 A1* | 4/2013 | Kim | G03B 43/00 |
| | | | 348/E13.016 |
| 2013/0113876 A1 | 5/2013 | Zhao et al. | |

| | | | |
|---|---|---|---|
| 2015/0130951 A1* | 5/2015 | Olson | G06T 7/80 |
| | | | 348/184 |
| 2016/0234479 A1* | 8/2016 | Seo | H04N 13/282 |
| 2017/0059313 A1* | 3/2017 | Lee | H04N 17/002 |
| 2017/0221210 A1* | 8/2017 | Martinello | G06T 7/80 |
| 2017/0287166 A1* | 10/2017 | Claveau | G06T 7/80 |
| 2018/0322657 A1* | 11/2018 | Dubout | G06V 10/44 |
| 2018/0343431 A1 | 11/2018 | Veldandi et al. | |
| 2019/0149788 A1* | 5/2019 | Liou | G01B 11/2504 |
| | | | 348/189 |
| 2019/0155382 A1* | 5/2019 | Ikuta | G09G 5/00 |
| 2019/0327458 A1* | 10/2019 | Urano | G06T 5/92 |
| 2020/0336733 A1* | 10/2020 | Frevert | G02B 26/124 |
| 2021/0110575 A1* | 4/2021 | Hu | G06F 3/14 |
| 2021/0112190 A1* | 4/2021 | Jia | G06T 7/85 |
| 2021/0350575 A1* | 11/2021 | Tang | G06T 7/73 |
| 2023/0086050 A1* | 3/2023 | Feldman | G06T 7/80 |
| | | | 382/154 |
| 2023/0377091 A1 | 11/2023 | Lee | |
| 2024/0095958 A1* | 3/2024 | Yamazaki | G06T 7/20 |
| 2025/0200804 A1* | 6/2025 | Troccoli | H04N 17/002 |

FOREIGN PATENT DOCUMENTS

| | | |
|---|---|---|
| TW | 201703506 | 1/2017 |
| TW | 202348025 | 12/2023 |

* cited by examiner

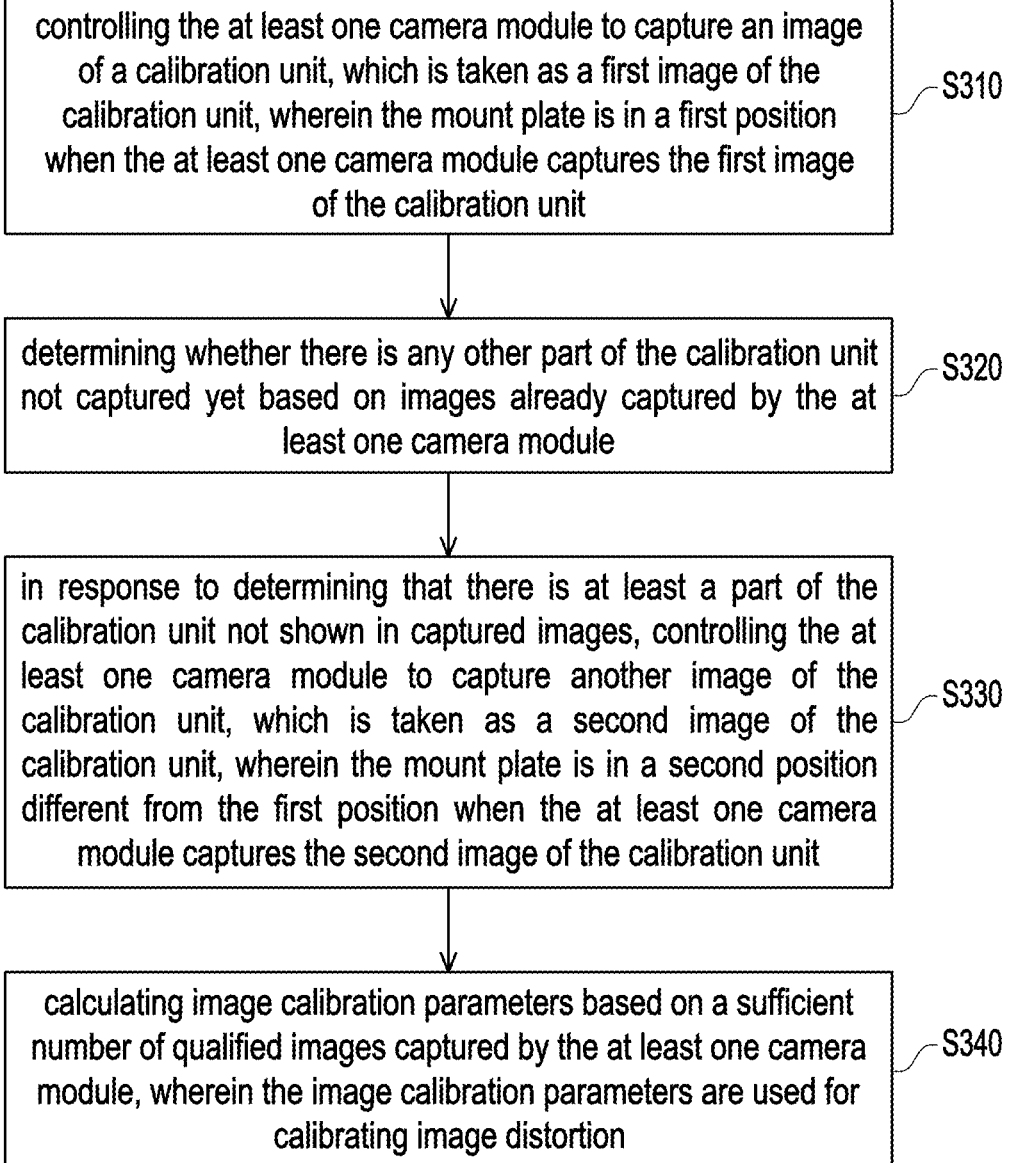

controlling the at least one camera module to capture an image of a calibration unit, which is taken as a first image of the calibration unit, wherein the mount plate is in a first position when the at least one camera module captures the first image of the calibration unit ⟋S310 determining whether there is any other part of the calibration unit not captured yet based on images already captured by the at least one camera module ⟋S320 in response to determining that there is at least a part of the calibration unit not shown in captured images, controlling the at least one camera module to capture another image of the calibration unit, which is taken as a second image of the calibration unit, wherein the mount plate is in a second position different from the first position when the at least one camera module captures the second image of the calibration unit ⟋S330 calculating image calibration parameters based on a sufficient number of qualified images captured by the at least one camera module, wherein the image calibration parameters are used for calibrating image distortion ⟋S340

FIG. 3

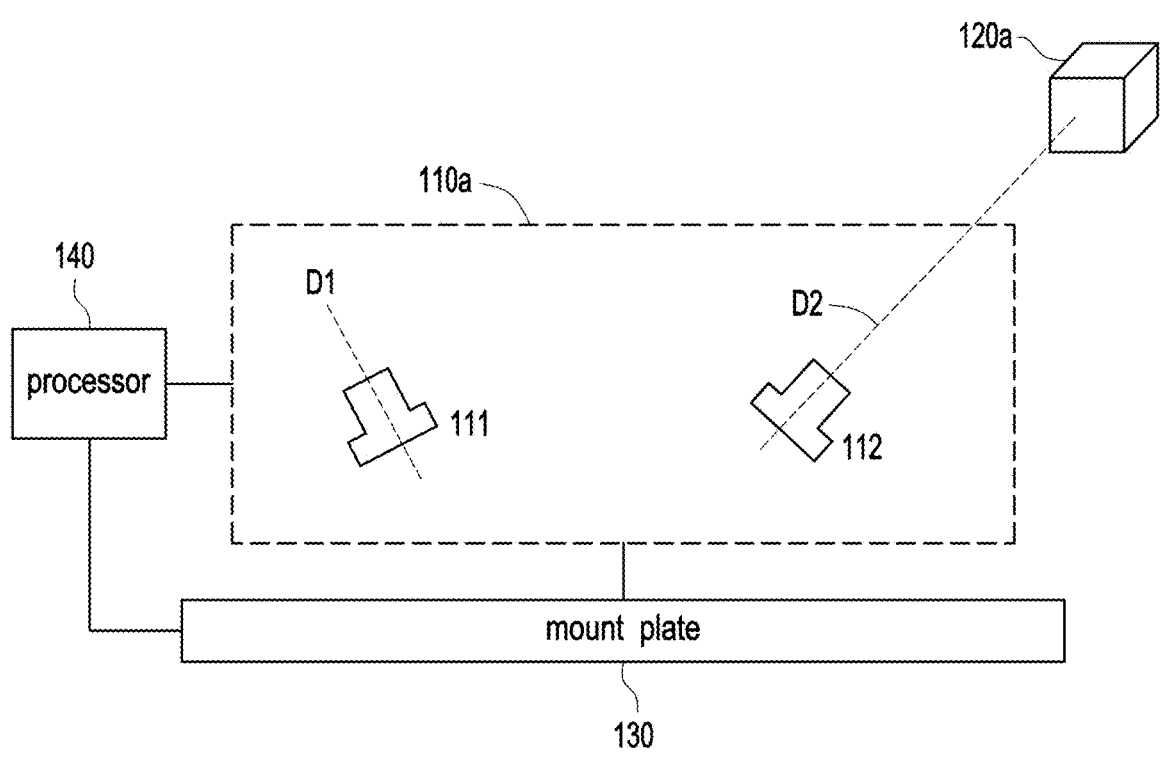
FIG. 4A
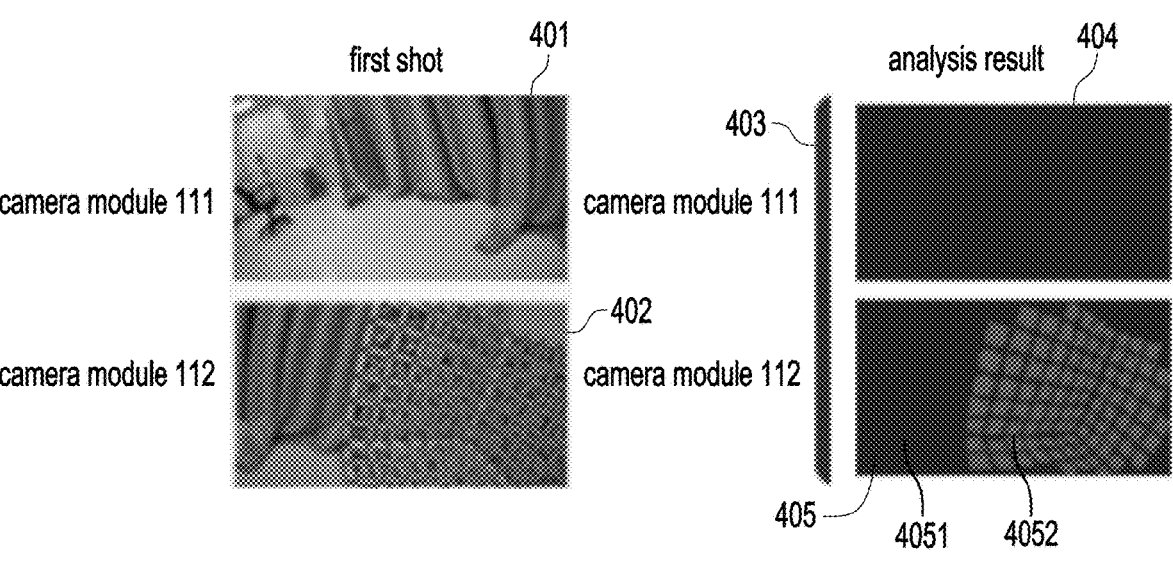
FIG. 4B
FIG. 4C

IMAGE CALIBRATION SYSTEM AND IMAGE CALIBRATION METHOD FOR CALIBRATING IMAGE CAPTURING DEVICE

BACKGROUND

Technical Field

The disclosure relates to an image calibration system, and more particularly, relates to an image calibration system and an image calibration method for calibrating an image capturing device.

Description of Related Art

Based on various kinds of scenarios, different types of cameras have been widely used in daily life, such as a single-lens reflex camera, a multi-lens camera, and an action camera. In order to generate uniformly sharp images by a camera, it is essential to perform an image calibration operation on the camera before capturing a formal image. However, conventional image calibration flow is designed based on various types of cameras, which is required to consider the viewing angle, degree of distortion, or assembly angle of a selected lens in different cameras. In particular, it takes a lot of time for calibrating a multi-lens camera to prevent the misalignment in an image stitching process. Therefore, it would be desirable to provide an efficient method to calibrate a camera.

SUMMARY

The disclosure provides an image calibration system and an image calibration method, which can automatically determine whether the captured images are qualified and sufficient for calibrating image distortion.

In an embodiment of the disclosure, an image calibration system is provided. The image calibration system includes an image capturing device, a calibration unit, a mount plate, and a processor. The image capturing device includes at least one camera module. The calibration unit is configured to be photographed by the image capturing device. The image capturing device is configured to be mounted on the mount plate, and the mount plate is configured to be moved or rotated to adjust a direction of a line of sight of the at least one camera module. The processor is coupled to the image capturing device. For the at least one camera module, the processor is configured to: control the at least one camera module to capture an image of the calibration unit, which is taken as a first image of the calibration unit, and the mount plate is in a first position when the at least one camera module captures the first image of the calibration unit; determine whether there is any other part of the calibration unit not captured yet based on images already captured by the at least one camera module; and in response to determining that there is at least a part of the calibration unit not shown in the captured images, control the at least one camera module to capture another image of the calibration unit, which is taken as a second image of the calibration unit, and the mount plate is in a second position different from the first position when the at least one camera module captures the second image of the calibration unit. The processor is further configured to calculate image calibration parameters based on a sufficient number of qualified images captured by the at least one camera module. The image calibration parameters are used for calibrating image distortion.

In an embodiment of the disclosure, an image calibration method for calibrating an image capturing device is provided. The image capturing device includes at least one camera module, and the image capturing device is configured to be mounted on a mount plate. The mount plate is configured to be moved or rotated to adjust a direction of a line of sight of the at least one camera module The image calibration method includes: controlling the at least one camera module to capture an image of a calibration unit, which is taken as a first image of the calibration unit, and the mount plate is in a first position when the at least one camera module captures the first image of the calibration unit; determining whether there is any other part of the calibration unit not captured yet based on images already captured by the at least one camera module; in response to determining that there is at least a part of the calibration unit not shown in captured images, controlling the at least one camera module to capture another image of the calibration unit, which is taken as a second image of the calibration unit, and the mount plate is in a second position different from the first position when the at least one camera module captures the second image of the calibration unit; and calculating image calibration parameters based on a sufficient number of qualified images captured by the at least one camera module. The image calibration parameters are used for calibrating image distortion.

Based on the above, in the embodiments of the disclosure, the processor of the image calibration system can automatically determine whether there is any other part of a calibration unit not captured yet based on images already captured by at least one camera module, which helps the image calibration system to obtain a sufficient number of qualified images required for calculating image calibration parameters. In addition, the image calibration system of the disclosure can quickly generate the image calibration parameters by freely positioning the at least one camera module toward a calibration unit without following any predetermined capture angle, thereby the image calibration system can be adapted for different types of the image capturing devices to be calibrated. Therefore, the image calibration system and the image calibration method of the disclosure can reduce a time length of an image calibration process, which enhances the efficiency of calibrating an image capturing device.

To make the aforementioned features more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3 is a flow chart of an image calibration method according to an embodiment of the disclosure.

FIG. 4A depicts an image capturing device which captures an image of a calibration unit.

FIG. 4B depicts captured images of a first shot by using the image capturing device shown in FIG. 4A according to an embodiment of the disclosure.

FIG. 4C depicts an analysis result with respect to each camera module according to an embodiment of the disclosure.

DESCRIPTION OF THE EMBODIMENTS

Figure 1:
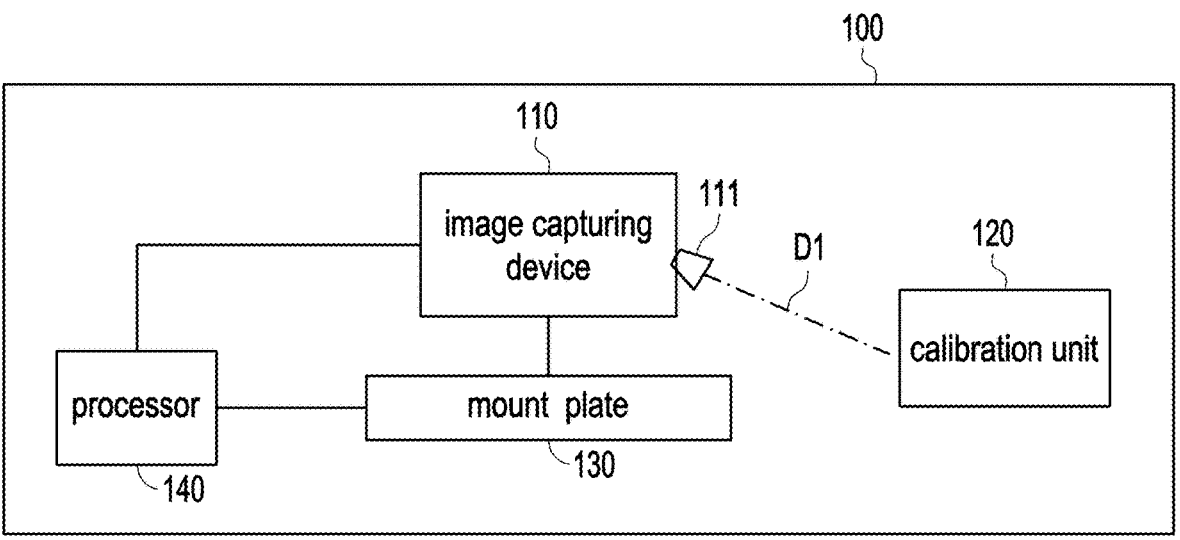
FIG. 1 is a block diagram of an image calibration system according to an embodiment of the disclosure.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/steps with the same reference numerals or symbols in different embodiments may be mutually referenced to the related description.

FIG. 1 is a block diagram of an image calibration system according to an embodiment of the disclosure. Referring to FIG. 1, the image calibration system 100 includes an image capturing device 110, a calibration unit 120, a mount plate 130, and a processor 140. The processor 140 and the mount plate 130 may be disposed on a test machine (not shown). The image capturing device 110 may be mounted on the mount plate 130, and the processor 140 is coupled to the image capturing device 110 and the mount plate 130. The calibration unit 120, which is to be photographed by the image capturing device 110, may include a test pattern for image calibration. According to design requirements, the calibration unit 120 may be a planar calibration plate or a three-dimensional calibration plate.

The image capturing device 110 in FIG. 1 may include at least one camera module 111, and a direction D1 of a line of sight of the at least one camera module 111 is adjustable by moving or rotating the mount plate 130. For example, a user may move the mount plate 130 along different direction or rotate the mount plate 130 around different axis to change a position of the mount plate 130. In other embodiments, a position of the mount plate 130 may be automatically controlled by the processor 140.

Figure 2A:
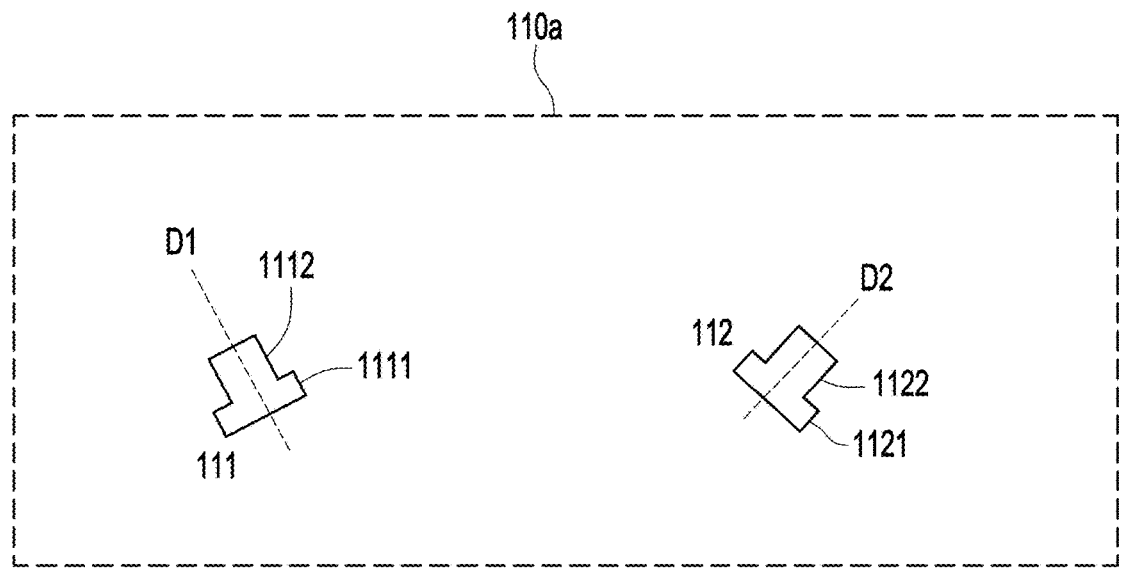
FIG. 2A depicts an image capturing device which integrates two camera modules according to an embodiment of the disclosure.

According to design requirements, the image capturing device 110 in FIG. 1 may be implemented as a multi-lens camera. For example, FIG. 2A depicts an image capturing device which integrates two camera modules according to an embodiment of the disclosure. In the embodiment of FIG. 2A, the image capturing device 110a may be a dual-lens camera which integrates a camera module 111 and a camera module 112. The camera module 111 includes an image sensor 1111 and a lens 1112, and the camera module 112 includes an image sensor 1121 and a lens 1122. In addition, a direction D1 of a line of sight of the camera module 111 is different from a direction D2 of a line of sight of the camera module 112, so that each of the camera module 111 and the camera module 112 may focus different images on each of the image sensor 1111 and image sensor 1121 at the same time.

Figure 2B:
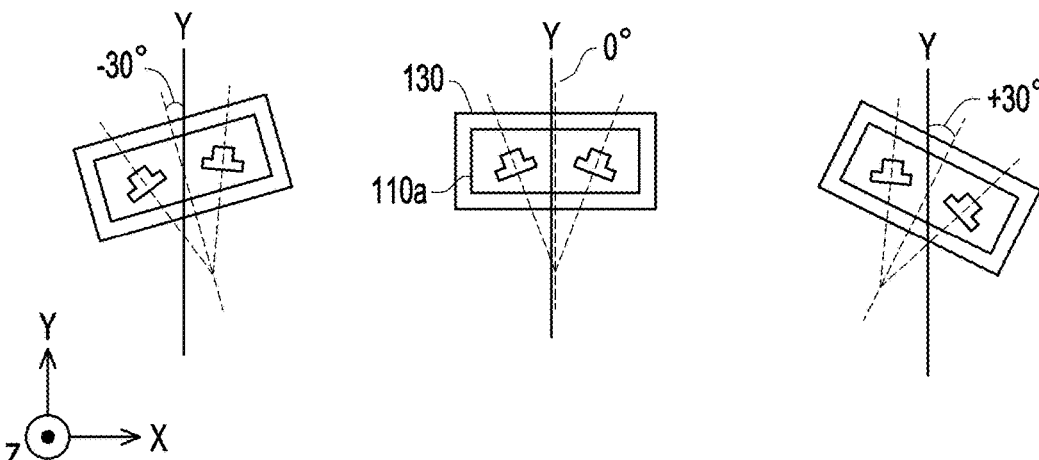
FIGS. 2B and 2C depict the image capturing device of FIG. 2A mounted on a mount plate which is rotated around different axis according to an embodiment of the disclosure.
Figure 2C:
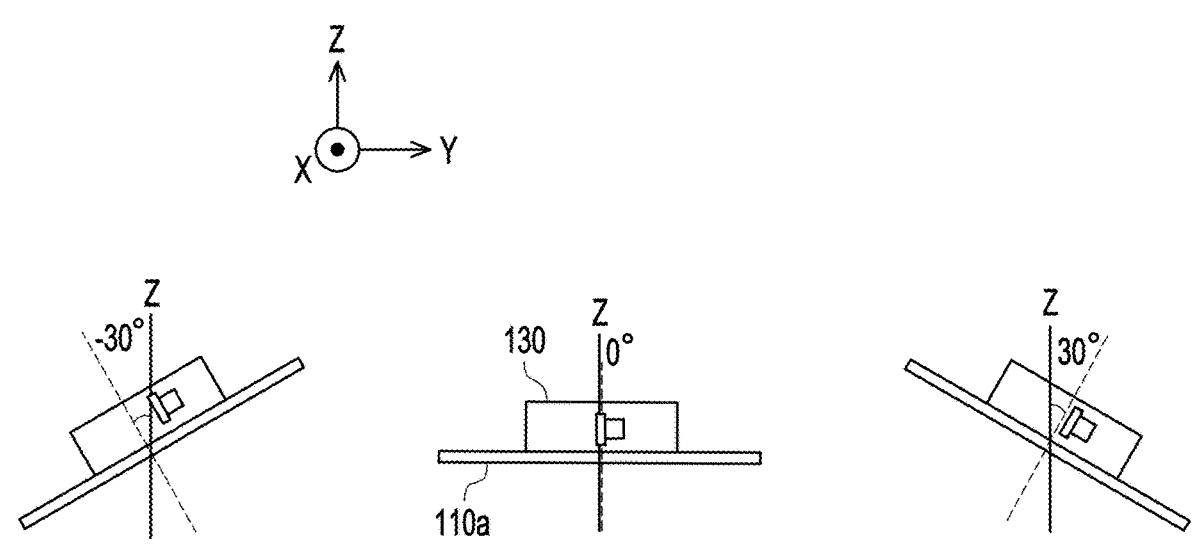

FIGS. 2B and 2C depict the image capturing device of FIG. 2A mounted on a mount plate which is rotated around different axis. As shown in FIG. 2B, the mount plate 130 disposed on the X-Y plane may be rotated around the Z axis and a rotation angle, e.g., 30° or −30°, is formed between the center line of the mount plate 130 and the Y axis, so that a direction D1 of a line of sight of the camera module 111 and a direction D2 of a line of sight of the camera module 112 can be adjustable. In FIG. 2C, the mount plate 130 disposed on the on the X-Y plane may be rotated around the X axis and a rotation angle, e.g., 30° or −30°, is formed between the normal line of the mount plate 130 and the Z axis, so that a direction D1 of a line of sight of the camera module 111 and a direction D2 of a line of sight of the camera module 112 can be adjustable. In other embodiments, the mount plate 130 disposed on the on the X-Y plane may be rotated around the Y axis. It should be noted that the rotation angles shown in FIGS. 2B and 2C are examples for illustration, which are not intended to limit the disclosure.

FIG. 3 is a flow chart of an image calibration method according to an embodiment of the disclosure. Referring to FIG. 1 and FIG. 3, the image capturing device 110 may be freely take pictures of the calibration unit 120 by moving or rotating the mount plate 130. For example, a user may manually move the mount plate 130 along different direction or rotate the mount plate 130 around different axis to change a position of the mount plate 130. In other embodiments, a position of the mount plate 130 may be automatically controlled by the processor 140. In step S310, the processor 140 may control the at least one camera module 111 to capture an image of the calibration unit 120, which is taken as a first image of the calibration unit 120. The mount plate 130 may be set in a first position when the at least one camera module 111 captures the first image of the calibration unit 120. After the first image is captured, the processor 140 in step S320 may determine whether there is any other part of the calibration unit 120 not captured yet based on images already captured by the at least one camera module 111. The detailed description of step S320 may be demonstrated below.

FIG. 4A depicts an image capturing device which captures an image of a calibration unit. In the embodiment of FIG. 4A, the calibration unit 120a may be a 3D calibration structure including a grid-like test pattern located on different 2D planes of a 3D space. In addition, the image capturing device 110a may be a dual-lens camera which integrates a camera module 111 and a camera module 112. When the processor 140 controls the image capturing device 110a to perform a first shot for capturing the calibration unit 120a, the camera module 111 and the camera module 112 may generate an individual image (shown in FIG. 4B) at the same time.

FIG. 4B depicts captured images of a first shot by using the image capturing device shown in FIG. 4A according to an embodiment of the disclosure. Referring to FIG. 4A and FIG. 4B, since only the direction D2 of a line of sight of the camera module 112 is toward the calibration unit 120a, an image 401 in FIG. 4B does not show any part of the calibration unit 120a, and an image 402 in FIG. 4B shows a part of the calibration unit 120a. In addition, the processor 140 may determine whether the image 401 and the image 402 in FIG. 4B are qualified to be used for image calibration. For example, the processor 140 in FIG. 4A may be coupled to a display device (not shown), which may include a display panel. The processor 140 may control the display device to display first auxiliary information accompanying the image 401 and the image 402. The first auxiliary information is used for indicating whether the image 401 and the image 402 in FIG. 4B are proper to be used in calculating image calibration parameters, or indicate whether the image 401 and the image 402 in FIG. 4B are proper to calculate the correlation between the camera module 111 and the camera module 112. Specifically, since the image 401 does not show any part of the calibration unit 120a, the image 401 may be presented in a gray color as the first auxiliary information to indicate that the image 401 is not qualified to be used for image calibration. In addition, the image 402 may be presented in a purple color as the first auxiliary information to indicate that the image 402 is proper to calculate the correlation between the camera module 111 and the camera module 112.

Based on the image 401 and the image 402 in FIG. 4B, the processor 140 in FIG. 4A may further generate an analysis result with respect to the camera module 111 and the camera module 112. For example, FIG. 4C depicts an analysis result with respect to each camera module according to an embodiment of the disclosure. Referring to FIG. 4B and FIG. 4C, since any part of the calibration unit 120a is not captured by the camera module 111, the processor 140 may generate an analysis result presented by an indication image 404 which indicates there is no image of the calibration unit 120a in the image 401. In addition, since a part of the calibration unit 120a is captured by the camera module 112, the processor 140 may generate an analysis result presented by an indication image 405 which distinguish parts (denoted by 4052) of the calibration unit 120a already captured in the image 402 and the other part (denoted by 4051) of the calibration unit 120a not captured yet in the image 402.

According to design requirements, the indication image may be displayed in two different colors easily distinguished by human eyes, such as green for illustrating parts of the calibration unit 120a already captured and red for illustrating parts of the calibration unit 120a not captured yet, so that a user can identify which part of the calibration unit 120a has not been captured. The display device, which is coupled to the processor 140, may further display a second auxiliary information which indicates that a plurality of images proper for calculating the correlation between the camera module 111 and the camera module 112 are not founded yet. For example, the display device may display a second auxiliary information 403 in FIG. 4C, like a bracket, to indicate that images proper for calculating the correlation between the camera module 111 and the camera module 112 are not found yet. If the image 401 in FIG. 4B is a blurred image (i.e., not qualified image), the processor 140 may control the image capturing device 110a to repeat capturing an image of the calibration unit 120a with the mount plate 130 being in the same position as the first shot until the captured image obtained in a second shot is qualified. In another embodiment, displaying the indication image and displaying auxiliary information may be not necessary steps for the image calibration system because the processor 140 can automatically control the image capturing device which is to be calibrated.

According to design requirements, each of the camera module 111 and the camera module 112 in FIG. 4A may include a wide-angle lens. When one of the camera module 111 and the camera module 112 captures the calibration unit 120a through the wide-angle lens, a fisheye-effect image may be generated. Therefore, the processor 140 may filter out a black region outside an aperture of the fisheye-effect image, and may use the filtered image for subsequent image calibration process. In some embodiments, if the captured images in a first shot do not contain at least parts of the calibration unit 120a, the processor 140 may discard the captured images obtained in a first shot. In addition, if the image quality of the captured images obtained in a first shot is not qualified (e.g., a blurred image), the processor 140 may also discard the captured images obtained in a first shot.

Referring to FIG. 1 and FIG. 3, when the processor 140 determines that there is at least a part of the calibration unit 120 not shown in captured images, the processor 140 in step S330 may control the at least one camera module 111 to capture another image of the calibration unit 120, which is taken as a second image of the calibration unit 120. The mount plate may be set in a second position different from the first position when the at least one camera module 111 captures the second image of the calibration unit 120. For example, referring to FIG. 5, since there is at least a part of the calibration unit 120 not shown in the image 402 in the first shot, the processor 140 controls the camera module 111 and the camera module 112 to capture images of the calibration unit 120a in a second shot at the same time. Referring to the images of the second shot shown in FIG. 5, both an image 501 captured by the camera module 111 and an image 502 captured by the camera module 112 present a part of the calibration unit 120a, but the processor 140 determines that only the image 502 is proper to calculate the correlation between the camera module 111 and the camera module 112. Therefore, the image 502 may be displayed in a purple color as the first auxiliary information to indicate that the image 502 is proper to calculate the correlation between the camera module 111 and the camera module 112. In addition, the image 501 may be displayed in a green color as the first auxiliary information to indicate that the image 501 is proper to calculate calibration parameters for calibrating image distortion caused by a lens of the camera module 111 even though the image 501 is not proper to calculate the correlation between the camera module 111 and the camera module 112.

Figure 5:
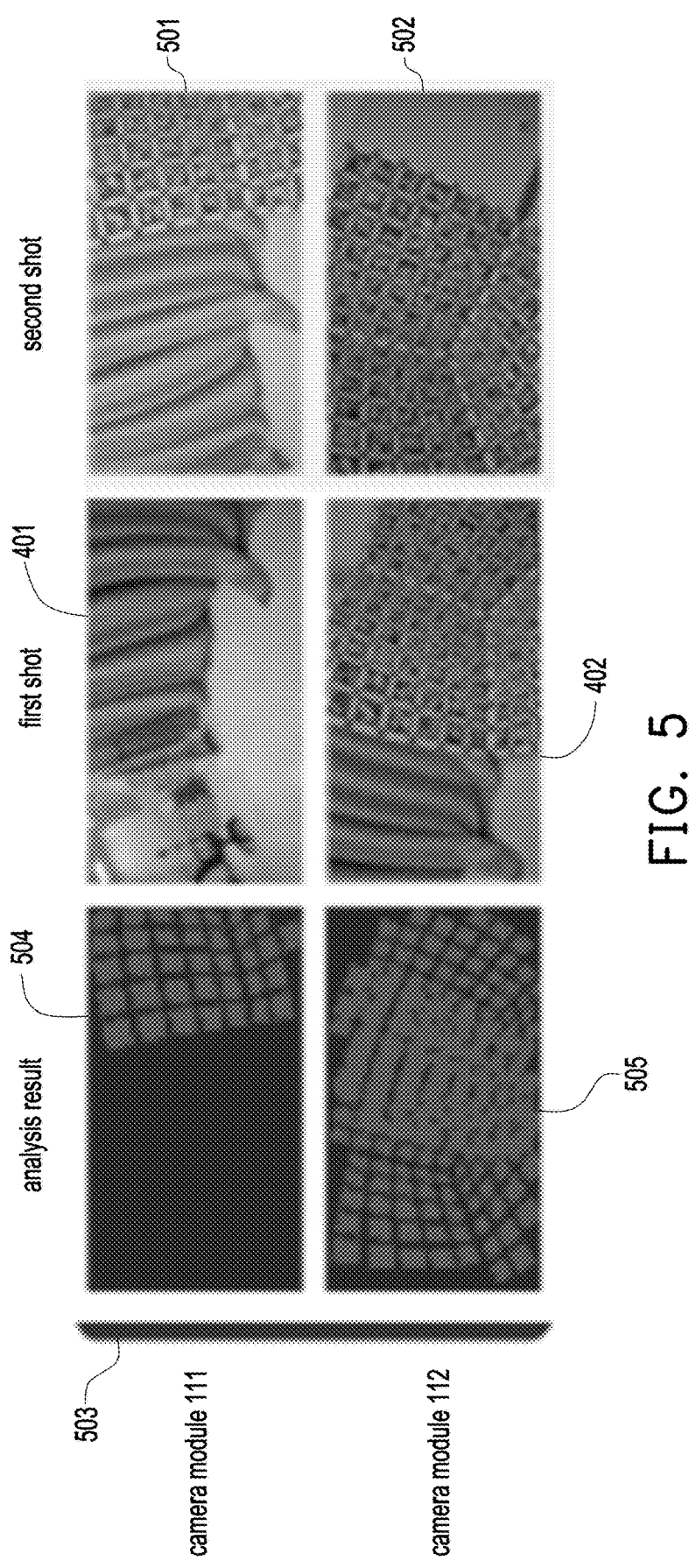
FIG. 5 depicts an analysis result with respect to each camera module and depicts currently accumulated images captured by the image capturing device shown in FIG. 4A according to another embodiment of the disclosure.

Referring to FIG. 4A and FIG. 5, the processor 140 may generate an analysis result based on the currently accumulated images (i.e., images 401, 402, 501, 502) captured by the camera module 111 and the camera module 112. In the second shot, each of the camera module 111 and the camera module 112 captures a part of the calibration unit 120a, so that an indication image 504 and an indication image 505 in FIG. 5, which respectively present the analysis results of images captured by the camera module 111 and the camera module 112, are generated. In addition, the indicated image 504 or 505 may present a superposition of the images captured by the respective camera module. In other embodiments, the indication message may be displayed in a form of a color block chart which uses blocks with the same color to indicate the parts of the calibration unit 120a having been captured. Referring to FIG. 5, since the image 501 is not proper for calculating the correlation between the camera module 111 and the camera module 112, the processor 140 may control a display device to display a second auxiliary information 503, as shown in FIG. 5.

Figure 6:
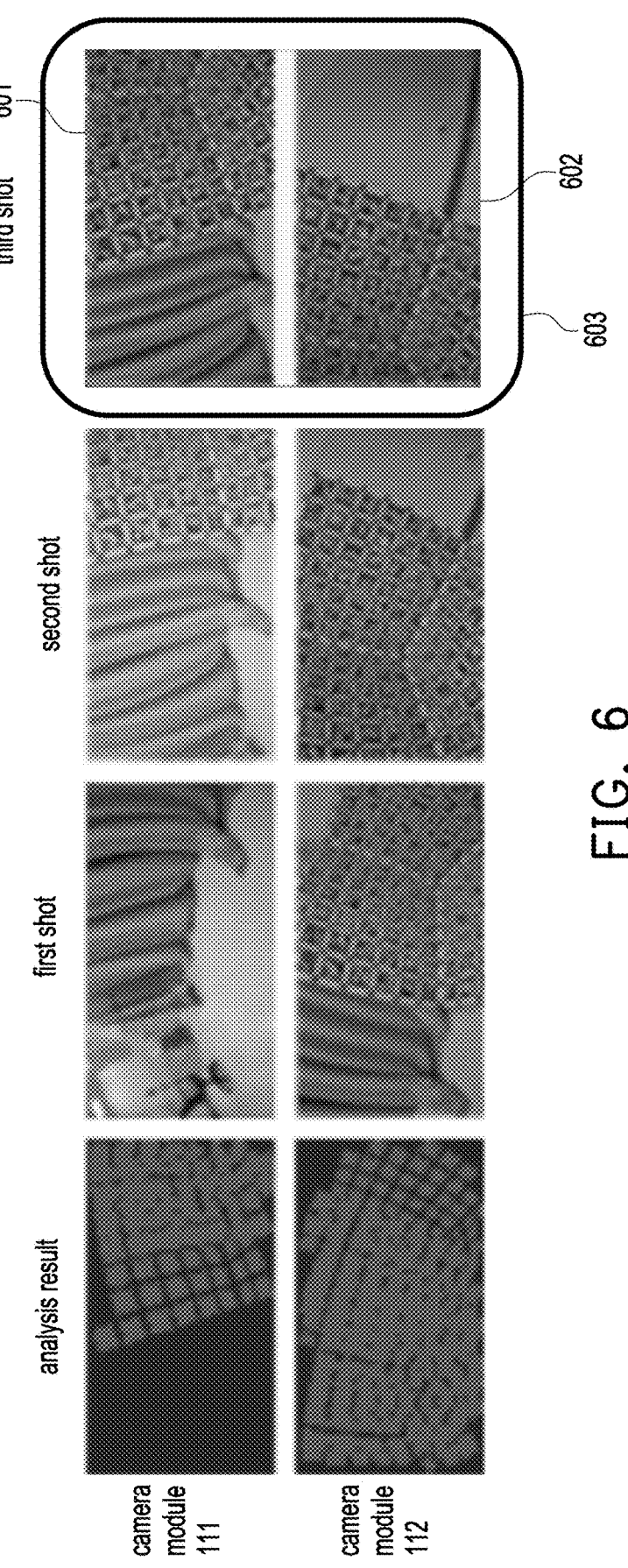
FIG. 6 depicts an analysis result with respect to each camera module and depicts currently accumulated images captured by the image capturing device shown in FIG. 4A according to another embodiment of the disclosure.

FIG. 6 depicts an analysis result with respect to each camera module and depicts currently accumulated images captured by the image capturing device shown in FIG. 4A according to another embodiment of the disclosure. Referring to FIG. 4A and FIG. 6, when the processor 140 determines that an image 601 and an image 602 in a third shot are proper to calculate the correlation between the camera module 111 and the camera module 112, the processor 140 may control a display device to display a third auxiliary information 603. The third auxiliary information 603 indicates that the image 601 and the image 602, which are proper for calculating the correlation between the camera module 111 and the camera module 112, are captured. Based on the third auxiliary information 603 displayed in FIG. 6, the second auxiliary information (i.e., indicating that a plurality of images proper for calculating the correlation between the camera module 111 and the camera module 112 are not captured yet) is not shown in FIG. 6. Since the image 601 and the image 602 are proper for calculating the correlation between the camera module 111 and the camera module 112, the processor 140 may control the display device to display both the image 601 and the image 602 in a purple color as the first auxiliary information.

Figure 7:
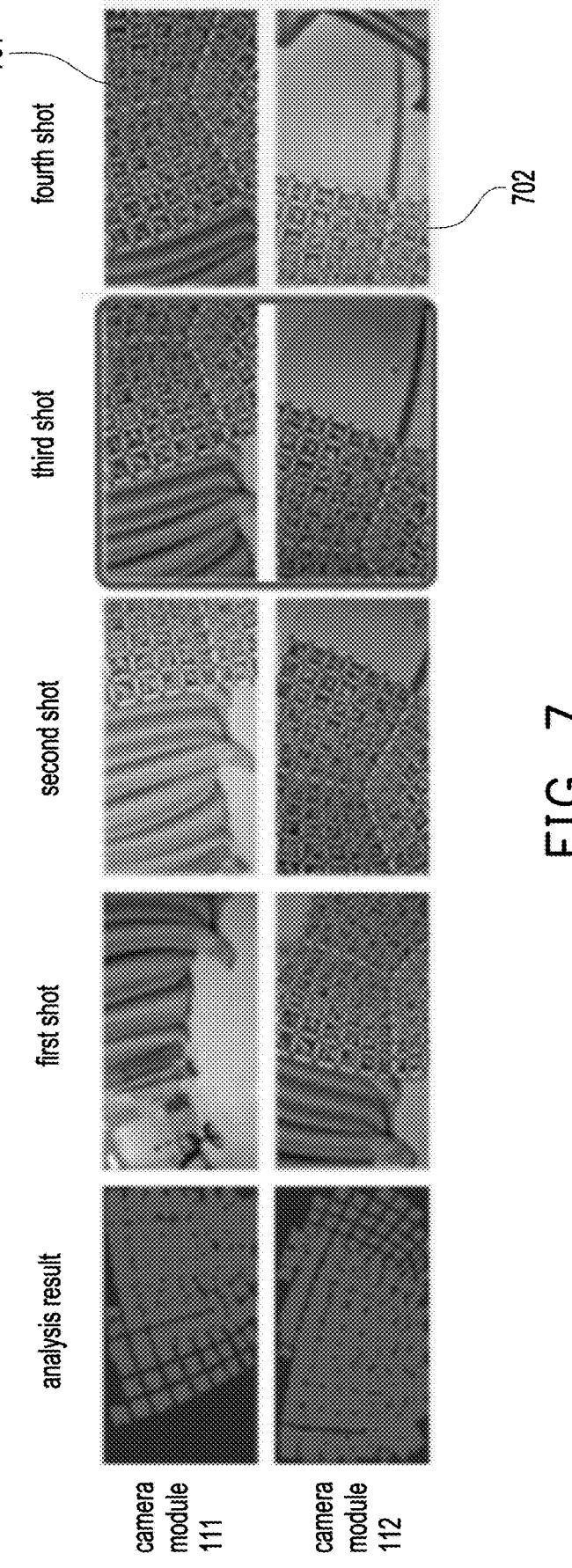
FIG. 7 depicts an analysis result with respect to each camera module and depicts currently accumulated images captured by the image capturing device shown in FIG. 4A according to another embodiment of the disclosure.

FIG. 7 depicts an analysis result with respect to each camera module and depicts currently accumulated images captured by the image capturing device shown in FIG. 4A according to another embodiment of the disclosure. Referring to the images of the fourth shot show in FIG. 7, both an image 701 captured by the camera module 111 and an image 702 captured by the camera module 112 present a part of the calibration unit 120a, but only the image 701 is proper to calculate the correlation between the camera module 111 and the camera module 112. Therefore, the image 701 may be displayed in a purple color as the first auxiliary information to indicate that the image 701 is proper to calculate the correlation between the camera module 111 and the camera module 112. In addition, the image 702 may be displayed in a green color as the first auxiliary information to indicate that the image 702 is proper to calculate calibration parameters for calibrating image distortion caused by a lens of the camera module 111, even though it is not proper to calculate the correlation between the camera module 111 and the camera module 112.

Figure 8:
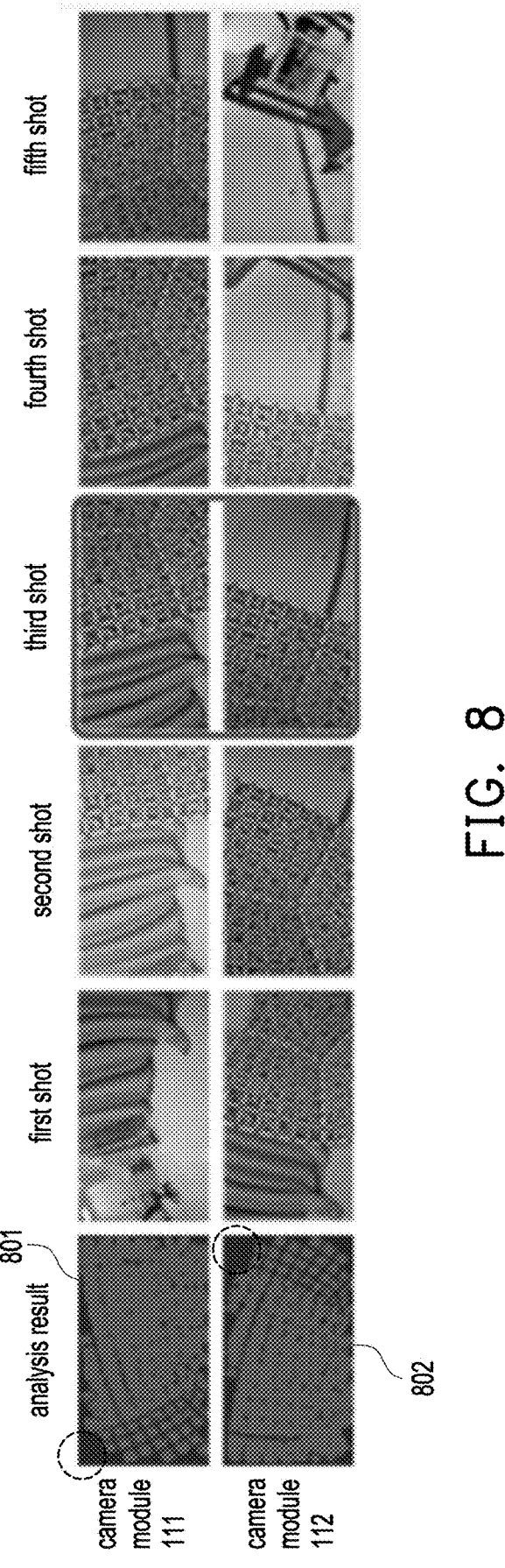
FIG. 8 depicts an analysis result with respect to each camera module and depicts currently accumulated images captured by the image capturing device shown in FIG. 4A according to another embodiment of the disclosure.

FIG. 8 depicts an analysis result with respect to each camera module and depicts currently accumulated images captured by the image capturing device shown in FIG. 4A according to another embodiment of the disclosure. Referring to FIG. 8, an indication image 801, as the analysis result of the captured images of the camera module 111, demonstrates a superposition image based on images captured by the camera module 111 from the first shot to the fifth shot, and an indication image 802, as the analysis result of the captured images of the camera module 112, demonstrates a superposition image based on images captured by the camera module 112 from the first shot to the fifth shot. The indication image 801 clearly indicates that an upper left corner of the calibration unit 120a has not been captured yet by the camera module 111, as shown in the dashed circle of the indication image 801. Similarly, the indication image 802 clearly indicates that an upper right corner of the calibration unit 120a has not been captured yet by the camera module 112, as shown in the dashed circle of indication image 802. Therefore, the captured images from the first shot to the fifth shot do not provide a sufficient number of qualified images for calculating image calibration parameters. Accordingly, the steps S310~S330 shown in FIG. 3 should be repeated to obtain a sufficient number of qualified images.

Figure 9:
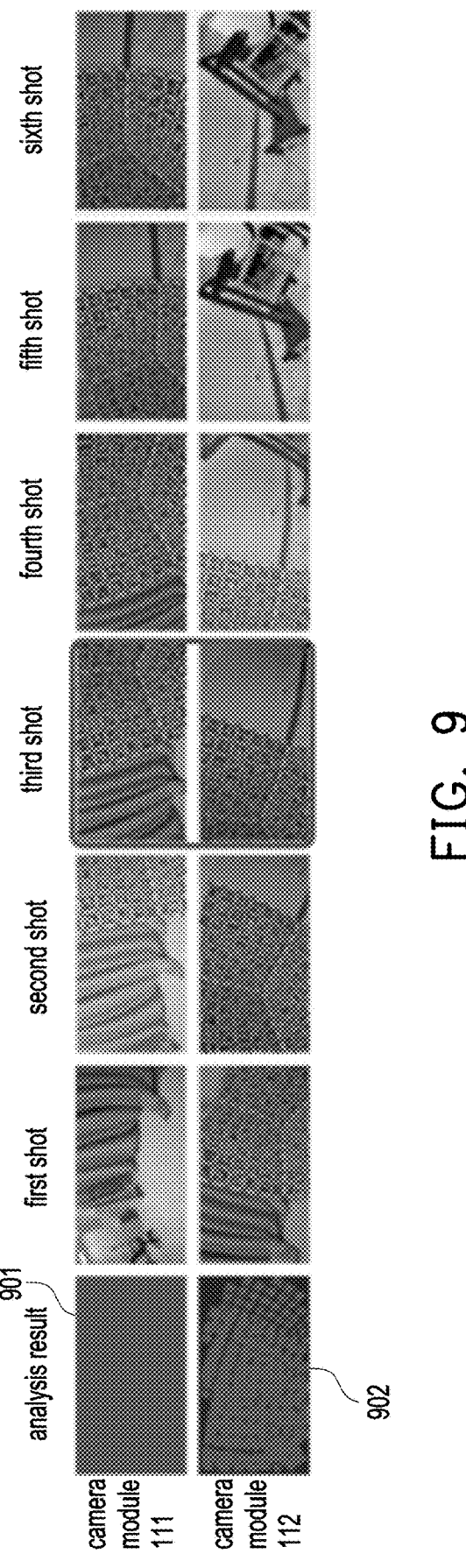
FIG. 9 depicts an analysis result with respect to each camera module and depicts currently accumulated images captured by the image capturing device shown in FIG. 4A according to another embodiment of the disclosure.

FIG. 9 depicts an analysis result with respect to each camera module and depicts currently accumulated images captured by the image capturing device shown in FIG. 4A according to another embodiment of the disclosure. Based on the images of the sixth shot shown in FIG. 9, the processor 140 determines that the upper left corner of the calibration unit 120a has been captured by the camera module 111. Therefore, the processor 140 may generate an analysis result, presented by an indication image 901, to indicate all parts of the calibration unit 120a have been captured by the camera module 111. The indication image 901 may be displayed in the form of a fully green color to instruct a user that a sufficient number of qualified images has obtained by the camera module 111. In addition, since the upper right corner of the calibration unit 120a has not been captured yet by the camera module 112, the processor 140 may generate an analysis result, presented by an indication image 902, to indicate the missing part of the calibration unit 120a.

Figure 10:
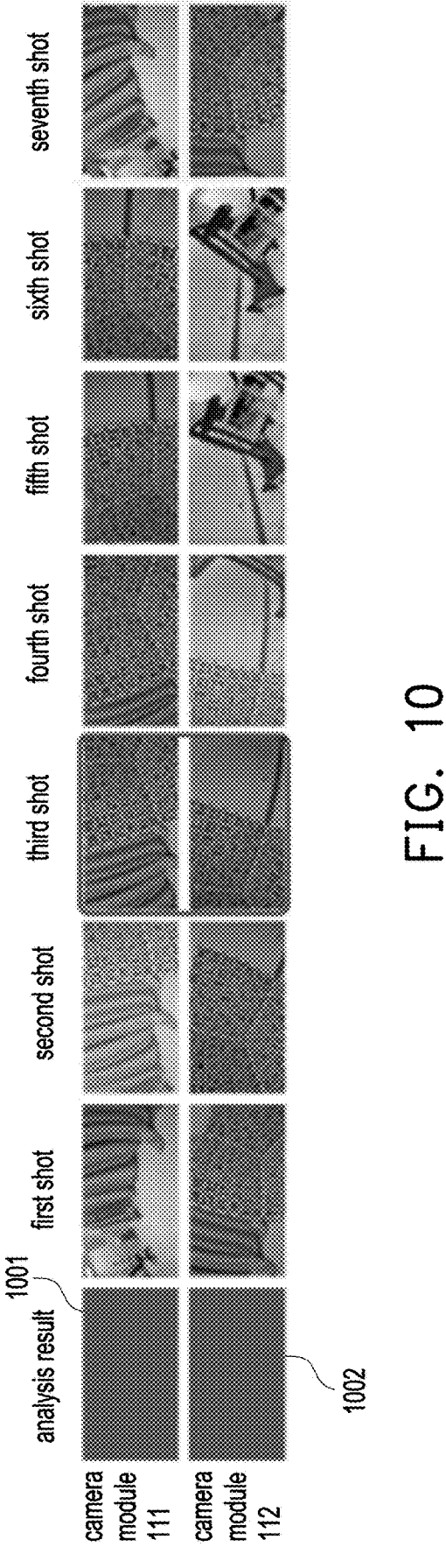
FIG. 10 depicts an analysis result with respect to each camera module and depicts currently accumulated images captured by the image capturing device shown in FIG. 4A according to another embodiment of the disclosure.

FIG. 10 depicts an analysis result with respect to each camera module and depicts currently accumulated images captured by the image capturing device shown in FIG. 4A according to another embodiment of the disclosure. Based on the images of the seventh shot shown in FIG. 10, the processor 140 determines that the upper right corner of the calibration unit 120a has been captured by the camera module 112. Therefore, the processor 140 may generate an analysis result, presented by an indication image 1002, to indicate all parts of the calibration unit 120a have been captured by the camera module 112. The indication image 1002 may be displayed in the form of a fully green color to instruct a user that a sufficient number of qualified images has obtained by the camera module 112. As shown in FIG. 10, since the indication image 1001 and the indication image 1002 respectively indicate that a sufficient number of qualified images has obtained by the camera module 111 and the camera module 112, the processor 140 may perform the step S340 in FIG. 3 to calculate image calibration parameters based on the sufficient number of qualified images captured by the camera module 111 and the camera module 112.

Based on a first sufficient number of qualified images captured by the camera module 111, the image calibration parameters calculated in step S340 may be used for calibrating image distortion caused by the nature of a lens of the camera module 111. Similarly, based on a second sufficient number of qualified images captured by the camera module 112, the image calibration parameters calculated in step S340 may be used for calibrating image distortion caused by the nature of a lens of the camera module 112. The image distortion caused by the nature of a lens of a single camera module (i.e., camera module 111 or camera module 112) may be a barrel distortion or pincushion distortion. Moreover, based on both a first sufficient number of qualified images captured by the camera module 111 and a second sufficient number of qualified images captured by the camera module 112, the image calibration parameters calculated in step S340 may also be used for calibrating image distortion cause by assembly tolerance between the camera module 111 and the camera module 112. Therefore, the image calibration system and the image calibration method of the disclosure are suitable to calibrate either a single lens camera or a multi-lens camera.

In summary, in the embodiments of the disclosure, benefit from the fact that the processor of the image calibration system can automatically determine whether there is any other part of a calibration unit not captured yet based on images already captured by at least one camera module, which helps the image calibration system to obtain a sufficient number of qualified images required for calculating image calibration parameters. In addition, the image calibration system of the disclosure can quickly generate the image calibration parameters by freely positioning the at least one camera module toward a calibration unit without following any predetermined capture angle, thereby the image calibration system can be adapted for different types of the image capturing devices to be calibrated. Therefore, the image calibration system and the image calibration method of the disclosure can reduce a time length in an image calibration process, which enhances the efficiency of calibrating an image capturing device.

Although the disclosure has been disclosed by the above embodiments, they are not intended to limit the disclosure. It will be apparent to one of ordinary skill in the art that modifications and variations to the disclosure may be made without departing from the spirit and scope of the disclosure. Therefore, the scope of the disclosure will be defined by the appended claims.

What is claimed is:

1. An image calibration system, comprising:
an image capturing device, including at least one camera module;
a calibration unit, configured to be photographed by the image capturing device;
a mount plate, wherein the image capturing device is configured to be mounted on the mount plate, and the mount plate is configured to be moved or rotated to adjust a direction of a line of sight of the at least one camera module;
a display device, wherein the display device is configured to display currently accumulated images captured by the at least one camera module and configured to display an analysis result with respect to the at least one camera module, wherein the analysis result is generated by the processor according to the currently accumulated images captured by the at least one camera module, and the analysis result presents parts of the calibration unit which have been captured; and
a processor, coupled to the image capturing device and the display device,
wherein for the at least one camera module, the processor is configured to:
control the at least one camera module to capture an image of the calibration unit, which is taken as a first image of the calibration unit, wherein the mount plate is in a first position when the at least one camera module captures the first image of the calibration unit;
determine whether there is any other part of the calibration unit not captured yet based on images already captured by the at least one camera module; and
in response to determining that there is at least a part of the calibration unit not shown in the captured images, control the at least one camera module to capture another image of the calibration unit, which is taken as a second image of the calibration unit, wherein the mount plate is in a second position different from the first position when the at least one camera module captures the second image of the calibration unit;
wherein the processor is further configured to calculate image calibration parameters based on a sufficient number of qualified images captured by the at least one camera module, wherein the image calibration parameters are used for calibrating image distortion.

2. The image calibration system according to claim 1, wherein the processor is further configured to:
determine whether the first image of the calibration unit is qualified to be used for image calibration; and
in response to determining that the first image of the calibration unit is not qualified, repeat controlling the at least one camera module to capture an image of the calibration unit with the mount plate being in the first position until a captured first image is qualified.

3. The image calibration system according to claim 1, wherein the analysis result is presented as an indicated image which shows the parts of the calibration unit having been captured.

4. The image calibration system according to claim 1, wherein the image capturing device comprises a plurality of camera modules, and the display device is further configured to display a first auxiliary information accompanying the first image of the calibration unit, wherein the first auxiliary information indicates that the first image of the calibration unit is not proper to be used in calculating the image calibration parameters, or the first auxiliary information indicates that the first image of the calibration unit is proper or improper to calculate a correlation among the plurality of camera modules.

5. The image calibration system according to claim 1, wherein the image capturing device comprises a plurality of camera modules, and the display device is further configured to display a second auxiliary information which indicates that a plurality of images proper for calculating the correlation among the plurality of camera modules are not captured yet.

6. The image calibration system according to claim 1, wherein the image capturing device comprises a plurality of camera modules, and the display device is further configured to display a third auxiliary information which indicates that a plurality of images captured by the plurality of camera modules when the mount plate is in the same position and are proper for calculating the correlation among the plurality of camera modules, are captured.

7. The image calibration system according to claim 1, wherein after the first image of the calibration unit is captured by the at least one camera module, the processor is configured to discard the first image of the calibration unit when the first image of the calibration unit does not contain at least parts of the calibration unit or when an image quality of the first image of the calibration unit is not qualified.

8. The image calibration system according to claim 1, wherein the processor is further coupled to the mounted plate, and the processor is configured to control the mount plate to change a position of the mount plate.

9. An image calibration method for calibrating an image capturing device, wherein the image capturing device comprises at least one camera module, and the image capturing device is configured to be mounted on a mount plate, wherein the mount plate is configured to be moved or rotated to adjust a direction of a line of sight of the at least one camera module, and the image calibration method comprises:

controlling the at least one camera module to capture an image of a calibration unit, which is taken as a first image of the calibration unit, wherein the mount plate is in a first position when the at least one camera module captures the first image of the calibration unit;

determining whether there is any other part of the calibration unit not captured yet based on images already captured by the at least one camera module;

in response to determining that there is at least a part of the calibration unit not shown in captured images, controlling the at least one camera module to capture another image of the calibration unit, which is taken as a second image of the calibration unit, wherein the mount plate is in a second position different from the first position when the at least one camera module captures the second image of the calibration unit;

controlling a display device to display currently accumulated images captured by the at least one camera module;

controlling the display device to display an analysis result with respect to the at least one camera module, wherein the analysis result is generated according to the currently accumulated images captured by the at least one camera module, and the analysis result presents parts of the calibration unit which have been captured; and calculating image calibration parameters based on a sufficient number of qualified images captured by the at least one camera module, wherein the image calibration parameters are used for calibrating image distortion.

10. The image calibration method according to claim 9, further comprising:

determining whether the first image of the calibration unit is qualified to be used for image calibration; and in response to determining that the first image of the calibration unit is not qualified, repeating controlling the at least one camera module to capture an image of the calibration unit with the mount plate being in the first position until a captured first image is qualified.

11. The image calibration method according to claim 9, wherein the analysis result is presented as an indicated image which shows the parts of the calibration unit having been captured.

12. The image calibration method according to claim 9, further comprising:

controlling the display device to display a first auxiliary information accompanying the first image of the calibration unit, wherein the first auxiliary information indicates that the first image of the calibration unit is not proper to be used in calculating the image calibration parameters, or the first auxiliary information indicates that the first image of the calibration unit is proper or improper to calculate a correlation among the plurality of camera modules.

13. The image calibration method according to claim 9, wherein the image capturing device comprises a plurality of camera modules, and the image calibration method further comprises:

controlling the display device to display a second auxiliary information which indicates that a plurality of images proper for calculating the correlation among the plurality of camera modules are not captured yet.

14. The image calibration method according to claim 9, wherein the image capturing device comprises a plurality of camera modules, and the image calibration method further comprises:

controlling the display device to display a third auxiliary information which indicates that a plurality of images, which are captured by a plurality of camera modules when the mount plate is in the same position and are proper for calculating the correlation among the plurality of camera modules, are captured.

15. The image calibration method according to claim 9, further comprising:

after the first image of the calibration unit is captured by the at least one camera module, discarding the first image of the calibration unit when the first image of the calibration unit does not contain at least parts of the calibration unit or when an image quality of the first image of the calibration unit is not qualified.

16. The image calibration method according to claim 9, further comprising:

controlling the mount plate to change a position of the mount plate.

\* \* \* \* \*